(12) United States Patent
Bongaerts

(10) Patent No.: US 8,999,906 B2
(45) Date of Patent: Apr. 7, 2015

(54) MACHINE PART COMPRISING A PHYSICAL COMPONENT COATED WITH A POLYELECTROLYTE LAYER

(75) Inventor: Jeroen Henricus Hubertus Bongaerts, Hilversum (NL)

(73) Assignee: Aktiebolaget SKF, Gothenburg (SE)

(*) Notice: Subject to any disclaimer, the term of this patent is extended or adjusted under 35 U.S.C. 154(b) by 818 days.

(21) Appl. No.: 13/141,032

(22) PCT Filed: Dec. 18, 2009

(86) PCT No.: PCT/EP2009/067576
§ 371 (c)(1),
(2), (4) Date: Aug. 26, 2011

(87) PCT Pub. No.: WO2010/070118
PCT Pub. Date: Jun. 24, 2010

(65) Prior Publication Data
US 2011/0296936 A1 Dec. 8, 2011

Related U.S. Application Data

(60) Provisional application No. 61/203,205, filed on Dec. 19, 2008.

(51) Int. Cl.
*C10M 107/00* (2006.01)
*C10M 149/14* (2006.01)
*C10M 173/02* (2006.01)
*C10M 177/00* (2006.01)

(52) U.S. Cl.
CPC ............ *C10M 149/14* (2013.01); *C10M 173/02* (2013.01); *C10M 177/00* (2013.01); *C10M 2209/12* (2013.01); *C10M 2217/041* (2013.01); *C10N 2230/06* (2013.01); *C10N 2240/02* (2013.01); *C10N 2240/04* (2013.01); *C10N 2240/10* (2013.01); *C10N 2250/14* (2013.01); *C10N 2250/141* (2013.01)

(58) Field of Classification Search
USPC .......................................................... 508/591
See application file for complete search history.

(56) References Cited

U.S. PATENT DOCUMENTS

2003/0087111 A1* 5/2003 Hubbell et al. ............... 428/457
2004/0249469 A1* 12/2004 Cohen et al. ................. 623/23.6
2005/0164895 A1* 7/2005 Spencer et al. ............... 508/508

(Continued)

FOREIGN PATENT DOCUMENTS

WO WO03089551 A2 10/2003
WO WO 2007026868 A1 * 3/2007
WO WO2007126057 A1 11/2007

*Primary Examiner* — Taiwo Oladapo
(74) *Attorney, Agent, or Firm* — Bryan Peckjian; SKF USA Inc. Patent Dept.

(57) ABSTRACT

The invention relates to a machine part comprising a first physical component, wherein: the first physical component is configured for moving relative to a second physical component; the first physical component has a first surface with a contact area for physical contact with the second physical component; the first physical component is shaped spatially complementarity to the second physical component at the contact area, and a polyelectrolyte layer is present on the first surface at a location of the contact area. The invention further relates to a machine comprising the present machine part and the second physical component. In addition, the invention relates to the use of a polyelectrolyte layer to reduce the friction between the first physical component and the second physical component, and a rolling-elements bearing.

15 Claims, 3 Drawing Sheets

Friction coefficients for PDMS, with and without lubricating coating. With the coating significant lower friction is achieved.

(56) References Cited

U.S. PATENT DOCUMENTS

| | | |
|---|---|---|
| 2007/0154128 A1 | 7/2007 | Mikami |
| 2007/0253655 A1* | 11/2007 | Egami et al. .................. 384/484 |
| 2009/0232432 A1* | 9/2009 | Egami et al. .................. 384/464 |
| 2011/0177987 A1* | 7/2011 | Lenting et al. ................ 508/204 |

* cited by examiner

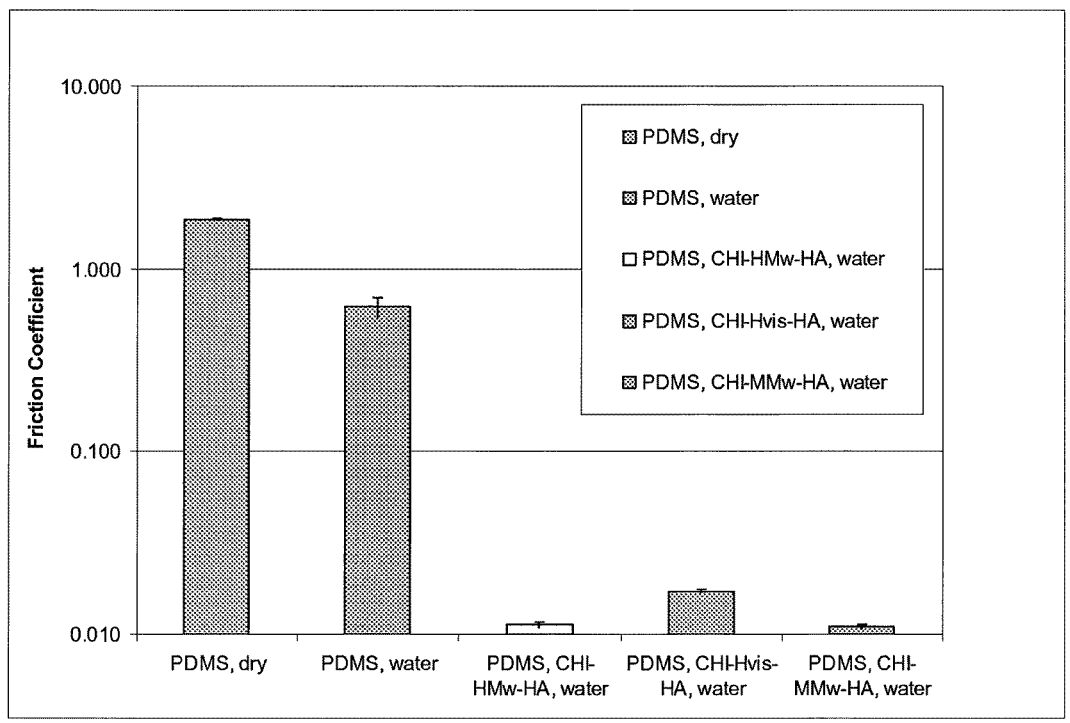
Figure 1. Friction coefficients for PDMS, with and without lubricating coating. With the coating significant lower friction is achieved.

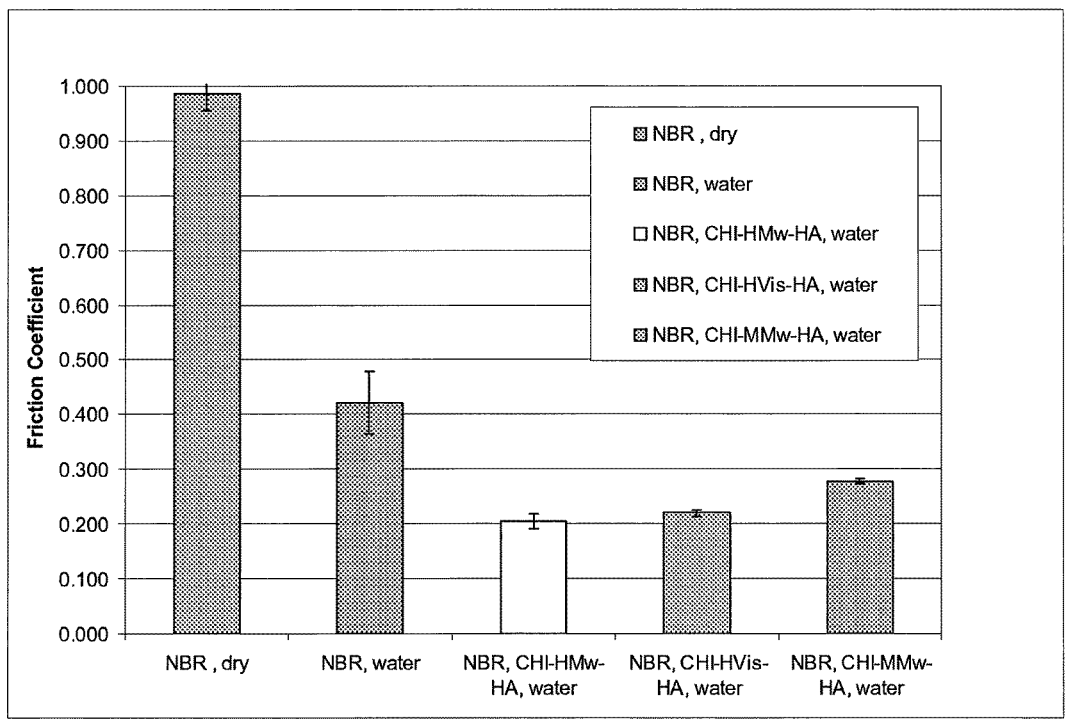
Figure 2. Friction coefficients for NBR, with and without lubricating coating. With the coating significant lower friction is achieved.

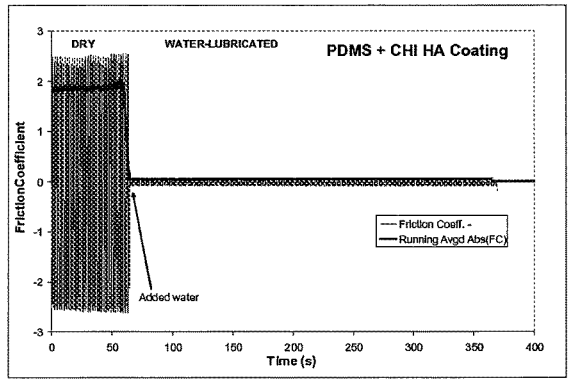
Figure 3. Friction coefficients for CHI-HA coatings on PDMS. Layers were first rubbed dry to test for robustness; water was then added subsequently as indicated.
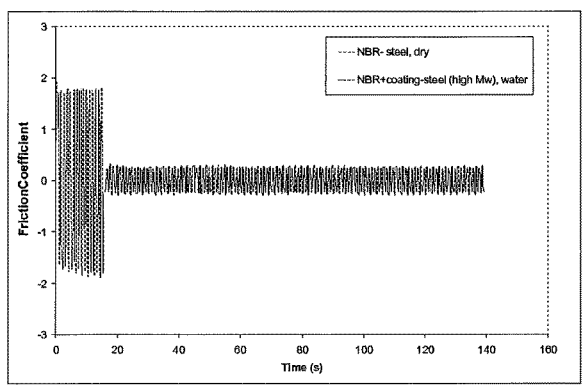
Figure 4. Friction coefficients for CHI-HA coatings on NRB rubber. Layers were first rubbed dry to test for robustness; water was then added subsequently as indicated.

MACHINE PART COMPRISING A PHYSICAL COMPONENT COATED WITH A POLYELECTROLYTE LAYER

RELATED APPLICATION

This application is a national stage entry of PCT/EP2009/067576, filed Dec. 18, 2009 which claims priority from provisional application 61/203,205, filed Dec. 19, 2008, which are incorporated by reference in their entirety.

FIELD OF THE INVENTION

The present invention relates to a machine part comprising a physical component coated with a polyelectrolyte layer, in particular a seal, a machine comprising the machine part, the use of the polyelectrolyte layer to reduce friction between physical components of the machine, and a rolling-elements bearing.

BACKGROUND OF THE INVENTION

Sliding friction of the seal-shaft contact is one of the main contributors (up to 70%) to the energy dissipation in many bearing applications such as wheel hubs for cars and trains. This is mainly a result of the fact that the friction coefficients ($\mu$) in seal applications are quite high and lie typically in the range of 0.2-0.7. Therefore, seals with significantly reduced friction coefficients would be advantageous.

Similar arguments are valid for other applications that have sliding surfaces such as sliding bearings (plain bearings), stern bearings and the sliding contacts in linear actuators.

As the contact pressures in seals are significantly lower than in the steel-steel contacts one usually finds in bearings, it is possible to look for alternative lubricants to traditionally applied oils and greases.

SUMMARY OF THE INVENTION

Object of the present invention is to provide an alternative set of lubricants to conventional oils and greases for use in a machine in which physical components move relative to one another.

Surprisingly, it has now been found that friction between components of a machine such as seals and shafts can attractively be reduced when a polyelectrolyte layer is present on the surface of at least one of the components.

Accordingly, the present invention relates to a machine part comprising a first physical component, wherein: the first physical component is configured for moving relative to a second physical component; the first physical component has a first surface with a contact area for physical contact with the second physical component; the first physical component is shaped spatially complementarily to the second physical component at the contact area, and a polyelectrolyte layer is present on the first surface at a location of the contact area.

The present invention also relates to a seal comprising a polyelectrolyte layer and a machine comprising the machine part. Further, the present invention relates to the use of a polyelectrolyte layer to reduce friction between physical components of the machine, and a rolling-elements bearing.

In the context of the present invention a machine is defined as an apparatus comprising mechanical components that can move with respect to each other in operational use of the apparatus. Typical operational uses include transport, industrial and construction applications.

DETAILED DESCRIPTION OF THE INVENTION

In accordance with the present invention use is made of a polyelectrolyte layer.

As is well understood a polyelectrolyte is a natural or synthetic electrolyte with high molecular weight, such as, for example, proteins and polysaccharides.

A wide variety of polyelectrolytes can be used in accordance with the present invention. Suitable examples of polyelectrolytes can be selected from the group consisting of poly(acrylic acid), poly(allylamine hydrochloride), L-carrageenan, poly[1-[4-(3-carboxy-4-hydroxy phenylazo)benzenesulfonamido]-1,2-ethanediyl, sodium salt, polyvinylsulfate, poly(3-sulfopropylmethacrylate), poly(acrylamido-2-methyl-propanesulfonate), poly(3-sulfopropylitaconate), polyester, poly(etherketone), poly(ethersulfone), poly(L-glutamic acid), exfoliated suspensions of lamellar metal disulfides, chondroitin sulfate, dextran sulfate, poly(ybenzylglutamate), poly(vinyl alcohol), poly(2-ethyl-2-oxazoline), human serum albumin, poly(2-acrylamido-2-methyl-1-propanesulfonic acid), poly(diallyldimethylammonium chloride), poly(ethylene imine), poly(4-vinylpyridine), (3-cyclodextrin (chloride salt), ionenes, poly(L-lysine), quaternized dimethylaminoethyl methacrylate, chitosan, hyaluronic acid, avidin, heparin, glycosaminoglycans, polysine, poly(glutamic acid), poly(aspartic acid), alginate, RNA, DNA, and enzymes.

Preferably, the polyelectrolyte layer comprises biological polymers. It will be understood that such biological polymers are positively and/or negatively charged.

Suitable examples of such biological polymers include for example chitosan and hyaluronic acid.

Preferably, the polyelectrolyte layer comprises a hygroscopic material.

The polyelectrolyte layer is preferably covalently bound to the first surface of the first physical component.

Preferably, the polyelectrolyte layer to be used comprises a polyelectrolyte multilayer. Suitably, the polyelectrolyte multilayer comprises multiple further layers in which each specific one of the further layers is bound to an adjacent one of the further layers.

The polyelectrolyte multilayer may comprise any combination of a wide range of different types of polyelectrolytes.

Preferably, each specific one of the further layers comprises one type of biological polymer.

The polyelectrolyte multilayer to be used in the present invention is prepared by using so-called layer-by-layer (LBL) deposition process. A negatively (or positively) charged surface of the first component is contacted with a solution containing positively (or negatively) charged polymers, thereby depositing a layer of the oppositely charged polymer onto the first surface of the first physical component until the surface attains that charge. By repeatedly dipping the surface in alternating positively and negatively charged solutions a polyelectrolyte multilayer assembly is created on the first surface of the first physical component. A polyelectrolyte multilayer having a thickness of a few nanometers can thus be obtained.

Suitably, the solution used in such LBL deposition process comprises an aqueous solution comprising electrolytes. A suitable example is for example a morpholino (ethanesulfonic acid) solution. The first physical component can suitably be left in such a solution for a relatively short time, after which the component or components can be taken out and rinsed using the same solution.

Preferably, the polyelectrolyte multilayer comprises multiple further layers in which each specific one of the further layers is covalently bound to an adjacent one of the further layers.

By creating covalent bonds between the first polyelectrolyte layer and the first surface of the first physical component as well as between each further specific layer, the layers and thus the multilayer as such is rendered significantly more robust as covalent bonds are much stronger than the Coulomb attraction between oppositely charged polymers. The covalent bonds ensure that the polyelectrolyte layer maintains attractive lubricating properties over a long period of time. By grafting the first polyelectrolyte layer covalently to the first surface of the first physical component, and by creating covalent bonds between each further specific layer, the life of the polyelectrolyte is increased by several orders of magnitude.

In accordance with the present invention the covalent bonds can suitably be established by using a cross-linking agent which allows the first polyelectrolyte layer and any subsequent layer to be chemically grafted onto the first surface of the first physical component as well as an adjacent layer.

A wide variety of cross-linking agents can be used in accordance with the present invention. A suitable cross-linking agent is for example 1-ethyl-3-(3-dimethylaminopropyl) carbodiimide) (EDAC).

The covalent bonds between the first polyelectrolyte layer and the first surface of the first physical component can for instance suitably be established by means of a sequence of treatments wherein the first surface of the first physical component is first made hydrophilic. The surface(s) can be rendered hydrophilic by means of, for example, an oxygen plasma treatment or suitable chemical treatments such as for example by means of a sodium chloride treatment.

Preferably, the hydrophilic surface so obtained can be functionalized before the LBL deposition process is applied. Suitably, the surface is functionalized by means of a cross-linking agent such as 1-ethyl-3-(3-dimethylaminopropyl)carbodiimide) (EDAC) or any other suitable cross-linking agent.

Such cross-linking agents can suitably activate carboxyl groups that are present on the hydrophilic surface, making the carboxyl groups capable of bonding to for instance amine or other chemical groups present in the polyelectrolyte layer to be applied.

An intermediate layer can suitably be used when it is difficult to attach the polyelectrolyte layer directly to the first surface of the first physical component. An intermediate layer can then be utilised that does allow chemical coating and that is easily deposited on the first surface of the first physical component. Such an intermediate layer can suitably comprise poly(dimethylsiloxane). Such an intermediate layer can for instance be established by dip coating the physical component concerned in a PDMS solution, comprising a PDMS base and a curing agent, dissolved at an appropriate concentration, allowing the formation of a thin and strong bonding layer. Such an intermediate layer can also suitably form a barrier against fluid ingress into the physical component concerned, for instance a seal. Subsequently, the polyelectrolyte layer can be applied onto the intermediate layer.

A particular embodiment of the present invention concerns a seal-shaft application wherein the seal is made of poly(dimethylsiloxane) (PDMS) and the shaft is made of stainless steel or hard plastic that can suitably be operated in the presence of water.

The surface of the seal is first made hydrophilic by exposing it to a plasma treatment. The plasma treatment renders the surface hydrophilic by the creation of carboxyl and hydroxyl groups. Once wetted, the water remains on the surface and does not de-wet easily. After exposing the PDMS surface to the plasma it can suitably be kept under water to prevent the surface from returning back to a hydrophobic state.

In the same way other elastomeric materials as for instance nitrile rubber (NBR) can be rendered hydrophilic.

After the plasma treatment, the carboxyl groups obtained at the exposed PDMS surface are activated with a cross-linking agent such as, for example 1-ethyl-3-(3-dimethylaminopropyl)carbodiimide) (EDAC). EDAC is a hetero-bifunctional crosslinker that activates carboxyl groups for amide bonding with primary amines. In addition, it will react with phosphate groups. In aqueous solutions EDAC undergoes hydrolysis, thus a stabilisation is preferably present for further coupling to amines. This can be done by adding NHS (N-hydroxysulfosuccinimide sodium salt). When PDMS surface has been functionalized, subsequently the LBL deposition process can be applied to the functionalized surface so obtained.

Suitably, at a location of the contact area a lubricant is present. Examples of suitable lubricants include water and hydrogels comprising water as well as fluids such as polar oils, alcohols, diethylglycol dibuthil ether, ionic liquids and dimethyl sulfoxide. Preferably, the lubricant used comprises a hydrogel comprising water, water or dimethyl sulfoxide, more preferably water. When the polyelectrolyte layer is hygroscopic the use of water as a lubricant brings about very attractive lubrication properties. Hence, in a particularly attractive embodiment of the present invention the polyelectrolyte is hygroscopic and the lubricant used comprises water. One considerable advantage of water is that it has a very low viscosity compared to usual lubricants. This reduces viscous drag and friction when one is operating in the elasto-hydrodynamic lubrication regime.

In accordance with the present invention the first physical component is configured for moving relative to a second physical component. In the context of the present invention the relative movement is suitably a rotation having one degree of freedom. In addition, it is observed that in accordance with the present invention the application of the machine parts in a machine typically involve a load on the contact area whose magnitude does not depend on the relative position of the first and second physical components with respect to each other. Moreover, the temperatures applied may suitably range between −60 to 110° C., such as in automotive and aircraft applications.

Suitably, the first physical component comprises a seal for protecting a further region where the first physical component and the second physical component engage.

In one embodiment of the present invention one of the first physical component and the second physical component comprises a seal, and the other one of the first physical component and the second physical component comprises a shaft or a physical object which is fixed to a shaft or is physically integrated with a shaft.

Preferably, the first physical component comprises a seal and the second physical component comprises a shaft. Such a seal and shaft are typically used in bearing applications.

Suitably, the physical object comprises a rolling-elements bearing; the rolling-elements bearing comprises an inner ring, an outer ring and a plurality of rolling elements accommodated between the inner and outer ring; the inner ring being mounted on the shaft, whereby the seal is in contact with the inner ring. The physical object may also suitable comprise a seal flinger.

In another embodiment of the present invention one of the first physical component and the second physical component comprises a shaft with a first threaded part, and the other one of the first physical component and the second physical component comprises a housing with a second threaded part, the housing accommodating the shaft, the first and second parts are mounted to engage with each other so as to impart an axial motion on the shaft in response to rotating of the second part of the housing. A suitable example of such an embodiment is a linear actuator. In that case the relative movement is characterised by a one-dimensional space, i.e. a curve or a trajectory, representing the one degree of freedom.

The first and second physical components can be made of the same type of material such as a metal, a metal alloy, a ceramic material or a hard plastic. Suitable metals include aluminium and copper. Suitable metal alloys include steel, stainless steel and brass. Suitable ceramic materials include silicon nitride, silicon carbide and zirconia. Suitable hard plastics include polyacetal, polyethylene, polypropylene and polytetrafluoroethylene, polyether ether keton and polyamide (Nylon) 66.

When the first physical component comprises a seal and the second physical comprises a shaft, the seal preferably comprises an elastomeric material and the shaft preferably comprises a metal alloy or a ceramic material. Suitable elastomeric materials include polyurethane, nitrile rubber (NBR), carboxylated nitrile rubber, highly saturated rubber, silicone rubber, polytetrafluoroethylene, thermoplastics, hydrogenated nitrile rubber, fluorinated rubbers and poly(dimethylsiloxane). Preferably, the elastomeric material comprises NBR. Suitable metal alloys of which the shaft can be made include steel, stainless steel and brass. Suitable ceramic materials include silicon nitride, silicon carbide and zirconia.

When the first physical component comprises a shaft and the second physical component comprises a housing accommodating the shaft, the shaft preferably comprises a metal alloy or a ceramic material and the housing comprises a plastic. Suitable metal alloys include steel, stainless steel and brass Suitable ceramic materials include silicon nitride, silicon carbide and zirconia. Preferably, the plastic comprises polyacetal, polyethylene, polypropylene or polytetrafluoroethylene, polyether ether keton and polyamide (Nylon) 66.

In such an embodiment the housing and shaft preferably form a linear actuator. The efficiency of linear actuators is reportedly in the range of 20-40% (work done divided by energy consumption of the motor), which means that most of the energy needed to move an object is lost in mechanical friction. A reduction of the typical friction coefficient from a current typical level of 0.1 to 0.01 could increase this efficiency to 80-90%. This has the advantage that a smaller motor could be used, allowing for much less energy consumption.

In seal-shaft applications suitably use can be made of a re-lubrication system. Such a system can be used to provide for additional lubricant. For instance, when water is applied as a lubricant, the provision of additional water can avoid that the friction will go up significantly if the polyelectrolyte would become dry due to the evaporation of the water. When the polyelectrolyte layer would become dry a seal will deform due to increased friction forces. Detection of such deformation can be established optically since a seal surface has a texture that can be photographed. This deformation profile can be found by performing correlation analysis between consecutive images in time. Such information can be used to give a signal to 're-lubricate', that is, add more water. In another embodiment use can be made of a porous seal that contains water. If friction goes up, the porous seal will be squeezed and some lubricant will be released. The mechanical deformation can also be used to give a mechanical lever action to release some lubricant. If a strain gauge is included in (or on) the seal, this could give an electronic signal to add some lubricant. If friction goes up, temperature will go up. Such a temperature rise can be identified by means of an optical signal using a strip that changes colour when the temperature changes, allowing additional lubricant to be provided.

Most linear actuators consist of a steel threaded shaft that moves inside a plastic (such as for example polyether ether keton and polyamide (Nylon) 66) threaded housing. The steel shaft carries the load and the threads slide within one another, producing significant friction losses as the total contact area is quite large. Stainless steel can suitably be used to allow the application of water as a lubricant. In another embodiment use can be made of a shaft that is steel from the inside and plastic on the outside, whereby the outside contains a thread to create a purely non-metallic contact.

In yet another embodiment use can be made of anti-corrosion-treated regular (and cheaper) steel, which has a higher load capacity than stainless steel. It comes with a $FeO_x$ surface finish, and enables coating with a polyelectrolyte layer. At dry sliding of a steel-steel contact it gives a friction coefficient between 0.1 and 0.2 at around 2 MPa contact pressures. Another possibility in accordance with the present invention is to use the steel as the backbone and to put a plastic sleeve coated by a polyelectrolyte layer over the steel backbone.

In one particular suitable linear actuator to be used in the present invention, the shaft and thread system is kept in a housing, sealed by a seal through which a (non-threaded) shaft protrudes, which allows the use of water as a lubricant.

Other applications in which the polyelectrolyte layer can be used include sliding bearings (plain bearings), stern bearings, and sliding contacts in under-water applications, such as ship propulsion, and water-turbines for energy generation. In under-water applications water is present naturally outside the bearing. In such applications as for example under-water turbines for energy generation and ship propulsion, water has to be kept outside the actual bearing and shaft environment. This can be established by using one or more lip seals that are lubricated by water and, further inward, several lip seals that are lubricated by oil, allowing low friction as well as a seal against pollution. This would also allow the application of high pressure on the low-friction lips and lower pressure for the higher friction seals. In this manner, good sealing against contaminants can be achieved, whereas at the same time water ingress is prevented at low overall sliding friction.

A major advantage of the use of the polyelectrolyte layer in accordance with the present invention is that it allows a product designer to separate the bulk material properties of the underlying material (such as rubbers for seals) from the tribological properties of the interface, where friction and wear are instigated. This provides designers with new opportunities. For example, the choice of seal material is based largely on its bulk thermo-mechanical properties. Therefore, when optimising the seal material for its frictional properties, this could go at the expense of the bulk properties and lead to faster ageing/degrading/wearing of the sealing material. The present invention results in a composite structure in which the bulk material of the seal can be selected based on the desired thermo-mechanical properties. On top of the seal material a thin polyelectrolyte layer can be deposited that lowers the friction by at least an order of magnitude.

The present invention also provides a machine comprising the machine part in accordance with the present invention and the second physical component.

Any of the polyelectrolyte layers as described hereinbefore may also be present at the surface of second physical component at a contact area between the first physical component and the second physical component.

Accordingly, the present invention also relates to a machine comprising a first physical component and a second physical component configured for moving relative to one another, wherein the first physical component and the second physical component are spatially complementarily shaped at a contact area between the first physical component and the second physical component, and wherein a polyelectrolyte layer is present on a first surface of the first physical component at a location of the contact area and/or a second surface of the second physical component at a location of the contact area.

The present invention provides a machine which can suitably be selected from the group consisting of motor vehicles, railroad equipment, ships, aircraft, industrial equipment, and construction equipment.

The first physical component can, for instance, suitably be a seal, shaft or a housing of a linear actuator comprising a polyelectrolyte layer in accordance with the present invention.

The present invention also relates to a seal comprising a layer for use in a machine according to the present invention.

In addition, the present invention also relates to the use of any of the polyelectrolyte layers defined hereinbefore to reduce friction between the first physical component and the second physical component in the machine.

The present invention further provides a rolling-elements bearing comprising an inner ring, an outer ring, a plurality of rolling elements between the inner ring and the outer ring, and a seal accommodated between the inner ring and the outer ring for protection of the rolling elements wherein: the inner ring and the outer ring are configured for coaxially rotating relative to one another; the seal and at least one of the inner ring and the outer ring are spatially complementarily shaped at a contact area between the seal and the at least one of the inner ring and the outer ring, and wherein a polyelectrolyte layer is present on a first surface of the seal and/or a second surface of the at least one of the inner ring and the outer ring at the contact area.

The present invention will now be illustrated by means of the following examples, which do not limit the invention in any way.

EXAMPLES

A number of slabs of two different elastomeric materials, PDMS and NBR, were coated with a polyelectrolyte multilayer consisting of the natural biopolymers chitosan (CHI), which is positively charged, and hyaluronic acid (HA), which is negatively charged. The surface of the PDMS slabs was exposed to an oxygen plasma treatment (4 minutes, 11 W plasma at a vapour (air) pressure of 0.2 mBar). This treatment simultaneous rendered the surface of the PDMS hydrophilic by the creation of carboxyl and hydroxyl groups. The contact angle of a drop of water on the surface changed from more than 90° before plasma treatment to less 30° after the plasma treatment. The surface of the NBR slabs was exposed to an oxygen plasma treatment (4 minutes, 28 W plasma at a vapour (air) pressure of 0.2 mBar). This treatment rendered the surface of the NBR hydrophilic. The contact angle of a drop of water on the surface changed from more than 90° before plasma treatment to about 30° after the treatment. The surfaces of the PDMS and NBR slabs were then functionalized using a solution of 1-ethyl-3-(3-dimethylaminopropyl)carbodiimide (50 mg/ml) and N-hydroxysulfosuccinimide sodium salt (70 mg/ml) dissolved in dimethylformamide. Then the polyelectrolyte multilayers were prepared using a LBL deposition process. The negatively charged PDMS and NBR slabs were dipped in a 5 mM MES (morpholino (ethanesulfonic acid)) solution containing CHI (50 µg/ml), thereby depositing a layer of the CHI onto the surfaces of the slabs until the surfaces attained a positive charge. In total three different solutions of chitosan were used resulting in three different first polyelectrolyte layers (see Tables 1 and 2). The slabs were left in the solution for 15 minutes, after which the slabs were taken out and rinsed by a 5 mM MES solution. Subsequently, the positively charged slabs so obtained were dipped in a 5 mM MES (morpholino (ethanesulfonic acid)) solution containing HA (50 µg/ml), thereby depositing a layer of the HA onto the surfaces of the PDMS and NBR slabs until the surfaces attained a negative charge. The slabs were left in the solution for 15 minutes, after which the elastomeric materials were taken out and rinsed by a 5 mM MES solution. In this way a number of slabs was obtained that were coated with a polyelectrolyte multilayer comprising a CHI layer and a HA layer.

TABLE 1

| Biopolymer | Mw (kDa) | Viscosity at 1% solution in water (mPa s) |
|---|---|---|
| Chitosan from crab shells - highly viscous | 600 | 580 |
| Chitosan - Coarse ground flakes and powder | 310-375 | 800-2000 |
| Chitosan - medium molecular weight | 190-310 | 590 |
| Hyaluronic Acid - lyophilized, high molecular weight polymer | 750 | N/A |

TABLE 2

| | Polyelectrolyte layers | | |
|---|---|---|---|
| | Positive polymer | Negative polymer | Lubricant |
| Layer 1 | Chitosan - medium molecular weight (MMw) | Hyaluronic Acid - lyophilized, high molecular weight | Water |
| Layer 2 | Chitosan from crab shells - highly viscous (Hvis) | Hyaluronic Acid - lyophilized, high molecular weight | Water |
| Layer 3 | Chitosan - Coarse ground flakes and powder, high Mw (HMw) | Hyaluronic Acid - lyophilized, high molecular weight | Water |

The friction coefficients of the respective polyelectrolyte layers were measured on a pin-on-disk tribometer operating in a linear oscillating motion with an amplitude of 5 mm (10 mm total travel) and a frequency of 1 Hz. The tribological contact consisted of a stainless steel ball (1.27 cm diameter, 316 stainless steel) pressed at a load of 1 N against a slab of the elastomeric material and mimics the typical elastomer-steel contact in a sealing application. Stainless steel was chosen to prevent corrosion when ions-containing water is used as a lubricant. Speed was oscillating between 0 and 31.4 mm/s. At these speeds the contact was operating in the boundary to mixed lubrication regime.

The average absolute values of the friction coefficients are shown for the PDMS and NBR slabs in FIG. 1 and FIG. 2 respectively. A comparison of the two friction curves for the PDMS and NBR slabs is shown in FIG. 3 and FIG. 4. The graphs show clearly that the friction coefficient decreases significantly when water is added to the tribological contacts when the multilayer was present. For PDMS the friction coefficient (.mu.) was reduced to about 0.01. No significant difference could be detected between the coatings using different versions of chitosan. This indicated that the molecular weight did not play a large role within the investigated range.

The reduction of friction for NBR slabs was less pronounced to values of about 0.2, though still highly attractive. It is likely that this is caused by the much higher surface roughness of the NBR slabs, when compared to the PDMS slabs.

The invention claimed is:

1. A machine part comprising:
a first physical component configured to move relative to a second physical component and having a first surface with a contact area for physical contact with the second physical component, the contact area of the first physical component being shaped spatially complementarily to the second physical component, and
a polyelectrolyte layer covalently bonded to at least a portion of the contact area of the first surface of the first physical component,
wherein the first physical component comprises a first rolling-element bearing ring, and
wherein the polyelectrolyte layer includes a biological polymer.

2. The machine part according to claim 1, wherein the polyelectrolyte layer includes a polyelectrolyte multilayer.

3. The machine part according to claim 1, wherein the polyelectrolyte layer includes a plurality of polyelectrolyte layers each covalently bonded to at least one adjacent layer.

4. The machine part according to claim 1, further comprising a lubricant disposed on the contact area.

5. The machine part according to claim 4, wherein the lubricant includes water and the polyelectrolyte layer includes a hygroscopic material.

6. The machine part according to claim 1, wherein the first and second physical components engage at a region separate from the contact area and the first physical component includes a seal for protecting the region.

7. The machine part according to claim 1, wherein one of the first physical component and the second physical component comprises a first one of a shaft and a seal and the second physical component comprises a second one of the shaft and the seal.

8. The machine part according to claim 1, wherein the first physical component comprises a shaft, the first rolling-element bearing ring being mounted on the shaft and the first surface being located on the first rolling-element bearing ring.

9. The machine part according to claim 7, wherein the first physical component comprises the shaft.

10. The machine part according to claim 7, wherein the first physical component comprises the seal.

11. A machine comprising the machine part of claim 1 and the second physical component.

12. The machine part according to claim 11, wherein one of the first physical component and the second physical component comprises a first one of a shaft and a seal and the second physical component comprises a second one of the shaft and the seal.

13. The machine according to claim 11, wherein the second physical component comprises a second rolling-element bearing ring and including a plurality of rolling elements between the first bearing ring and the second bearing ring.

14. The machine according to claim 12, wherein the first physical component comprises the shaft.

15. The machine part according to claim 12, wherein the first physical component comprises the seal.

* * * * *